Nov. 4, 1947.    W. MESSINGER    2,430,359
ANTIFRICTION THRUST BEARING
Filed June 27, 1944
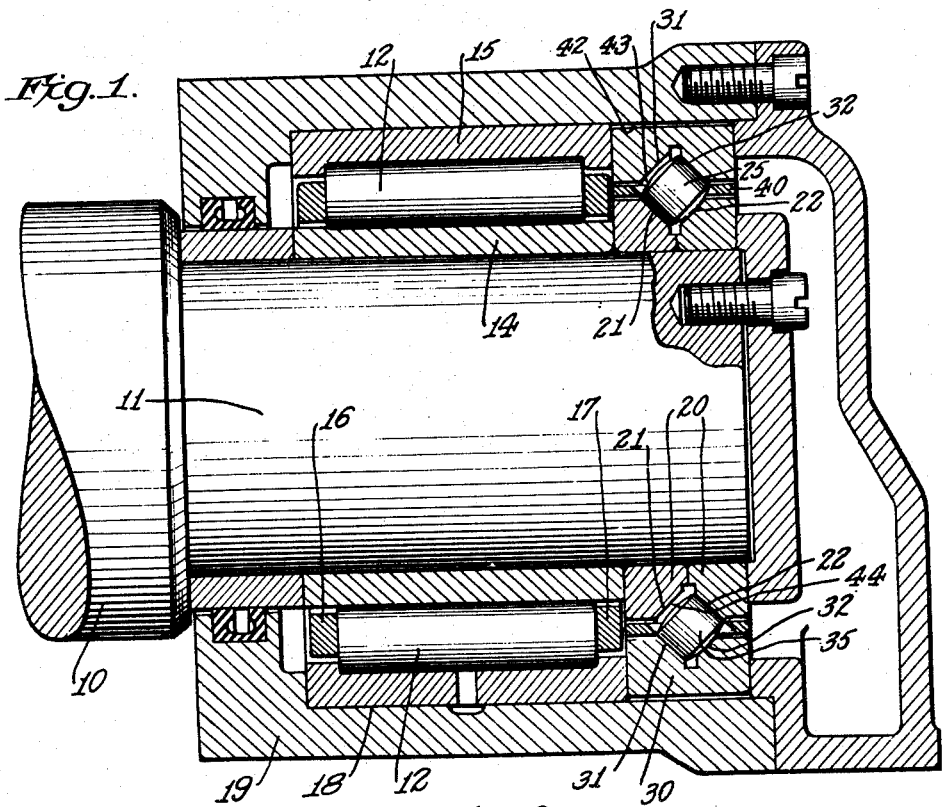
Fig. 1.
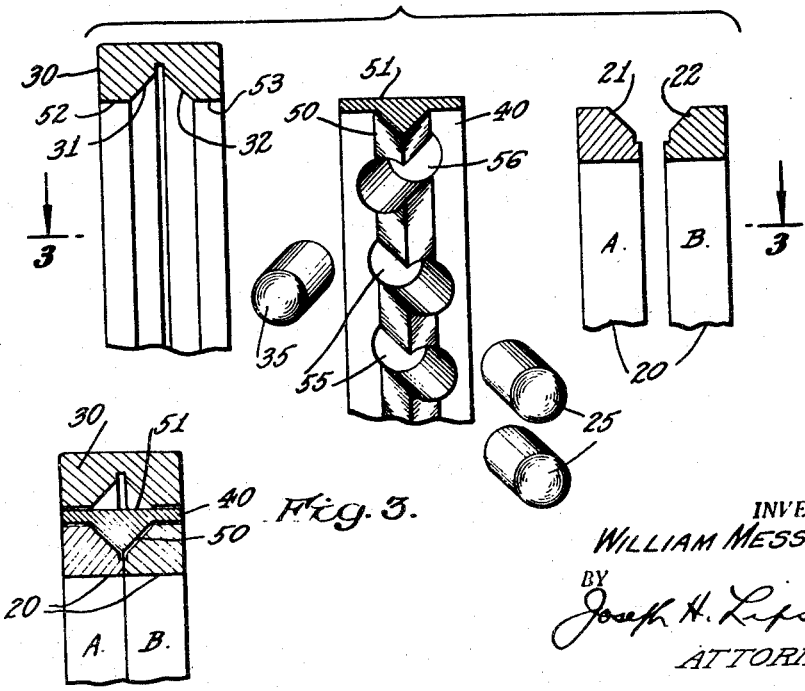
Fig. 2.
Fig. 3.
INVENTOR.
WILLIAM MESSINGER
BY
Joseph H. Lipschutz
ATTORNEY Patented Nov. 4, 1947

2,430,359

UNITED STATES PATENT OFFICE 2,430,359

ANTIFRICTION THRUST BEARING

William Messinger, Philadelphia, Pa.

Application June 27, 1944, Serial No. 542,301

2 Claims. (Cl. 308—234)

This invention relates to bearings for a rotating member such as a shaft, and it is one of the objects of this invention to provide a bearing system designed to absorb load forces in all three principal directions, i. e., radially of the rotating member, and axially in both directions. For this purpose an annular row of rollers is provided, the rollers being disposed with their axes parallel to the axis of the rotating member for taking up radial load forces, and a second annular row of rollers is provided in the form of an X-bearing for taking up axial load forces in both directions. In the X-bearing, certain of the rollers have their axes inclined in one direction with respect to the axis of rotation of the rotatable member, while the other rollers have their axes inclined in the opposite direction with respect to the axis of rotation of the rotatable member.

The two annular rows of rollers constitute a radial bearing and a two-way axial thrust bearing; and it is another object of this invention so to correlate these bearings with respect to each other as to insure that the radial load forces are not transmitted to the axial thrust bearing.

The X-bearing comprises inner and outer races between which the oppositely inclined rollers are supported. Heretofore each race comprises two sections movable relative to each other. The inner race sections were supported on the rotating member and were thus maintained in fixed relation in a direction radial to the axis of the rotating member. The outer race sections however were free to move in a direction radial to the axis of the rotating member within the clearance limits. This caused displacement of the outer race sections with respect to each other and such loss of concentricity obviously rendered the bearing inefficient because the proper relationship of bearing surfaces was lost. It is therefore still another object of my invention to provide an X-bearing in a system of the type described in which the outer race members will at all times retain their concentricity and alignment.

In X-bearings, it has heretofore been the practice to make the rollers of the same axial length as their diameter. This was due to the fact that the bearing surfaces on which one roller operated provided the supporting or limiting surfaces for the ends of the axis of the oppositely inclined roller. However, the distance between the bearing surfaces is reduced in response to load forces and this resulted in frictional engagement between these surfaces and the ends of the axes of the oppositely inclined roller, causing canting of the axis of this roller in the direction of rotation of the rotatable member. It is another object of my invention to provide rollers in an X-type bearing in which the axial length of the rollers is less than their diameter by at least a predetermined amount as specified hereinafter.

Under many operating conditions the load force axially of the rotating member in one direction exceeds the load force in the other direction. Still another object of my invention is the provision of an X-bearing in which more rollers are provided for taking up load forces axially of the rotating member in one direction than are provided for taking up load forces in the opposite direction.

Further objects and advantages of this invention will become apparent in the following detailed description thereof.

In the accompanying drawings;

Fig. 1 is an elevation, largely sectioned vertically, showing a bearing assembly comprising bearing means for taking radial load forces and axial load forces in two directions.

Fig. 2 is a dismantled view of a portion of an X-bearing.

Fig. 3 is a view taken substantially on the line 3—3 of the Fig. 2 bearing when assembled, showing a cross section through a solid or unbored portion of the cage.

Referring to Fig. 1, there is shown a bearing system designed to take up load forces of a rotatable member in all three major directions with respect to the axis of rotation of the member, i. e., radially and axially in both directions. The rotating member may be a shaft 10 and the bearing system is shown as applied to one end. The system comprises a radial roller bearing for sustaining radial load forces and an X-bearing for sustaining the axial thrust in both directions.

The radial roller bearing may comprise an annular row of rollers 12 disposed with their axes parallel to the axis of rotation of the shaft and operating between inner and outer races 14 and 15 and roller cage members 16 and 17. These races are housed within a bore 18 in the bearing housing 19.

For sustaining the axial load forces in both directions there is provided an X-bearing which will perform these functions with but a single annular row of rollers. The X-bearing comprises inner and outer races 20 and 30, each of which includes a pair of bearing surfaces 21, 22 and 31, 32, each pair being oppositely inclined to the axis of rotation of the rotatable member and preferably forming a right angle between the surfaces. The surfaces 21, 32 and 22, 31 cooperate to form pairs of roller bearing surfaces. Certain of the rollers, such as rollers 25, are shown as rolling on surfaces 21 and 32 to take the axial load forces in one direction, while the other rollers 35 roll on surfaces 22 and 31 to take the axial load forces in the opposite direction. The rollers thus operate with their axes of rotation inclined in opposite directions with respect to the axis of rotation of shaft 10. It is this arrangement which enables a single row of rollers to accomplish the function of taking up load force in both axial directions—a function which otherwise requires two such rows of rollers. For holding the rollers 25 and 35 in properly spaced relation between the inclined surfaces 21, 22, 31, 32 there is provided a cage 40 of special construction to be described hereinafter.

By the bearing system described above I am enabled by the use of but two annular rows of rollers to provide means for sustaining load forces not only radial to the axis of the rotation but also axially in both directions. A simple, compact, effective and complete bearing support is thus provided for the rotating member.

In such bearing system, the highest efficiency is obtained when the radial rollers sustain the entire radial load force and when none of this force is placed upon the X-bearing rollers. The bearings are so correlated as to insure this condition. For this purpose the total clearance of the radial roller bearing in the housing is made substantially less than the clearance of the X-bearing. This is apparent from Fig. 1 of the drawing where the clearance for the radial bearing is too small to be illustrated but a substantial clearance is plainly indicated at 42 in the case of the X-bearing. This construction means that none of the radial load forces will be placed upon the X-bearing which will, as a result, be able to operate at maximum efficiency to sustain the axial load forces in both directions. The clearance for the X-bearing is made so much larger than that for the radial bearing that even after successive regrindings of the radial bearing the radial load forces will still not be transmitted to the X-bearing.

Since the X-bearing is provided with substantial clearance between it and the bore of the housing, I construct the outer race 30 of a single piece instead of forming it in two parts like the parts A and B comprising the inner race 20. The two parts of the inner race being mounted upon the shaft 10 are relatively fixed and cannot become displaced radially. However, if the outer race were formed in two parts, the large clearance would enable these parts to become displaced radially, thus losing their concentricity and upsetting the relationship which should exist between the bearing surfaces. The result would be loss of efficiency and increased wear. However, by forming the outer race of a single piece, such relative radial displacement is impossible.

Forming the outer race member of a single piece involves a special design of the cage 40. As shown in Figs. 2 and 3, the cage is formed with only a single annular projection 50 on the inner surface while the outer surface 51 is cylindrical with no outer projection thereon. The cylindrical surface 51 bears against the cylindrical bores 52, 53 of the outer race. The projection 50 is triangular in section to cooperate with the surfaces 21 and 22 and is provided with bores 55 and 56 for accommodating the rollers in the two directions of inclination.

Under many operating conditions, the axial load force in one direction exceeds the axial load force in the other direction. For such conditions, I provide more rollers positioned to take the axial load force in the direction of the greater force than in the direction of the lesser force. Thus, in Fig. 2, I have shown two bores 55 with their axes in one direction (the direction of greater axial load force) as against one bore 56 with its axis in the other direction (the direction of lesser axial load force). Any other ratio may be employed in accordance with the particular operating conditions.

In all X-bearings heretofore employed, the axial length of the rollers was made equal to the diameter of the rollers having the opposite inclination. Where, as in the present case, the diameters of both sets of rollers 25 and 35 were the same, the axial length of each roller was made exactly equal to its own diameter. This diameter represented the distances between bearing surfaces 21 and 32 and between bearing surfaces 22 and 31. Therefore the ends of the axis of each roller 25 touched the surfaces on which rollers 35 rolled, and the ends of the axis of each roller 35 touched the surfaces on which rollers 25 rolled. The result of such construction was that when an axial load force was placed on one set of rollers, for example, rollers 35, the distance between bearing surfaces 31 and 22 was reduced by the elastic deformation of rollers 35 and by the indentation of the races 31 and 22 caused by such rollers under load. Only two races are under thrust at one time. The other rollers 25 are not taking axial load force at this time. Since the axial length of rollers 25 is equal to the original distance between race surfaces 31 and 22 before the axial load force was placed upon it, and since the distance between races 31 and 22 has diminished under this force due to the elastic deformation of rollers 35 and the indentation of the races 31 and 22, it necessarily follows that the rollers 25 were placed under axial compression. The rollers 25 canted in the direction of rotation and created friction. The objectionable factors thus introduced become readily apparent.

For obviating the above-described condition, I provide that the axial length of the rollers having one inclination shall be less than the diameters of the rollers having the opposite inclination, so that as shown in Fig. 1, at 43 and 44, the axis of each roller is provided with clearance between it and the corresponding races forming the bearing surfaces for the rollers of opposite inclination. Thus, the axial length of rollers 25 is less than the distance between bearing surfaces 31 and 22 on which rollers 35 roll, and the axial length of rollers 35 is less than the distance between bearing surfaces 21 and 32 on which rollers 25 roll. The amount by which the diameter of one set of rollers exceeds the axial length of the other set (or of the same set, if both sets of rollers have the same diameter) must exceed the total elastic deformation of the roller and indentation of the race surfaces under maximum axial load.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A thrust bearing structure for a shaft rotatably supported against radial loads in a bore in a bearing casing by means of annular row of relatively large cylindrical rollers; the combination therewith of an outer race member mounted in the bore and having an external diameter less than the diameter of the bore, an inner race member mounted on the shaft, a first pair of opposed race surfaces on the inner and outer race members, the race surfaces being substantially parallel and inclined at an acute angle to the axis of the shaft, a second pair of opposed race surfaces on the inner and outer race members, the second pair of race surfaces being substantially perpendicular to the first pair of race surfaces and forming with the first race surfaces the major portions of the boundary walls of an annular space between the race members, cylindrical rollers of less axial length than the distance between the second pair of race surfaces by an amount at least as great as the elastic deformation of the rollers and race members under load, the rollers being in rolling contact with the first pair of race surfaces, other cylindrical rollers of less axial length than the distances between the first pair of race surfaces by an amount at least as great as the elastic deformation of the rollers and the race members under load, the other rollers being in rolling contact with the second pair of race surfaces whereby the rollers are capable of limited axial movement in the annular space, and means for retaining the outer race member against axial movement in the bearing casing.

2. A thrust bearing structure for a shaft adapted to be supported in a bearing casing comprising an outer race member having a V-shaped groove in its inner surface forming right angularly related race surfaces, an inner race member having a V-shaped groove in its outer surface forming right angularly related race surfaces facing the race surfaces of the outer race member, one of the race members being split circumferentially at the base of the groove therein to form two separable rings, a bearing cage member between the race members, having a V-shaped rib extending into the groove in the split race member and a cylindrical opposite surface, and right angularly related sets of rollers rotatably mounted in the cage, one of the sets of rollers being in rolling engagement with one pair of opposed race surfaces on the inner and outer race members, and the other set of rollers being in rolling engagement with the race surfaces in right angular relation to the first-mentioned pair of race surfaces, the lengths of the rollers being less than the spacing between the race surfaces in right angular relation to the race surfaces with which they are in rolling engagement by an amount at least equal to the amount of elastic deformation of the rollers and indentation of the race surfaces under loads exerted thereon.

WILLIAM MESSINGER.

REFERENCES CITED

The following references are of record in the file of this patent:

UNITED STATES PATENTS

| Number | Name | Date |
|---|---|---|
| 939,269 | Killian | Nov. 9, 1909 |
| 1,235,116 | Coppage | July 31, 1917 |
| 1,638,957 | Pitt | Aug. 16, 1927 |
| 1,774,655 | Messinger | Sept. 2, 1930 |
| 1,966,924 | Couch | July 17, 1934 |
| 2,349,824 | Irasek | May 30, 1944 |